United States Patent
Hu

(10) Patent No.: US 9,569,052 B2
(45) Date of Patent: Feb. 14, 2017

(54) SENSING CIRCUIT AND METHOD FOR SENSING TOUCH ACTION ON CAPACITIVE TOUCH-SENSING PANEL

(71) Applicant: TOUCHPLUS INFORMATION CORP., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 0 days.

(21) Appl. No.: 14/674,633

(22) Filed: Mar. 31, 2015

(65) Prior Publication Data

US 2015/0205414 A1    Jul. 23, 2015

Related U.S. Application Data

(63) Continuation-in-part of application No. 14/054,331, filed on Oct. 15, 2013, now abandoned.

(30) Foreign Application Priority Data

Oct. 16, 2012    (TW) .............................. 101138099 A

(51) Int. Cl.
G06F 3/045    (2006.01)
G06F 3/044    (2006.01)
G06F 3/041    (2006.01)

(52) U.S. Cl.
CPC ............. G06F 3/044 (2013.01); G06F 3/0418 (2013.01)

(58) Field of Classification Search
CPC ................................ G06F 3/044; G06F 3/0418
USPC .................................................. 345/173, 174
See application file for complete search history.

(56) References Cited

U.S. PATENT DOCUMENTS

| | | | |
|---|---|---|---|
| 4,233,522 A | 11/1980 | Grummer et al. | |
| 6,970,160 B2 | 11/2005 | Mulligan et al. | |
| 7,030,860 B1 | 4/2006 | Hsu et al. | |
| 8,144,132 B2 | 3/2012 | Chen et al. | |
| 8,274,481 B2 | 9/2012 | Nishimura et al. | |
| 2008/0158180 A1* | 7/2008 | Krah | G06F 3/03545 345/173 |
| 2009/0108914 A1* | 4/2009 | Zhang | H03K 17/962 327/517 |

(Continued)

FOREIGN PATENT DOCUMENTS

| | | |
|---|---|---|
| TW | 201218643 | 5/2012 |
| WO | 2009/090534 | 7/2009 |

*Primary Examiner* — Calvin C Ma
(74) *Attorney, Agent, or Firm* — Muncy, Geissler, Olds & Lowe, P.C.

(57) ABSTRACT

A sense signal is continuously received from a capacitive touch-sensing panel. A reference signal is set or adjusted to have a level of the sense signal be in a first relation to that of the reference signal in an initial state, and the sense signal is compared with the reference signal to generate a comparison signal in a sensing state. The comparison signal is outputted with a first logic level when a level of the sense signal is in the first relation to a level of the reference signal, and outputted with a second logic level when a level of the sense signal is in a second relation to a level of the reference signal. Whether a touch action is conducted is determined according to a compared result of occurrences of the first and second logic levels of the comparison signal generated within a preset time period.

20 Claims, 15 Drawing Sheets

(56) References Cited

U.S. PATENT DOCUMENTS

2010/0117986 A1* 5/2010 Yang .................. H03K 17/9622
                                                   345/174
2010/0302205 A1   12/2010 Noma
2011/0050634 A1    3/2011 Lin et al.
2012/0056834 A1    3/2012 Kim et al.

* cited by examiner

SENSING CIRCUIT AND METHOD FOR SENSING TOUCH ACTION ON CAPACITIVE TOUCH-SENSING PANEL

CROSS-REFERENCE TO RELATED APPLICATIONS

The present application is a continuation-in-part application claiming benefit from a US patent application bearing a Ser. No. 14/054,331 and filed Oct. 15, 2013, contents of which are incorporated herein for reference.

FIELD OF THE INVENTION

The present invention relates to a sensing method and a sensing circuit, and more particularly to method and circuit for sensing a touch action on a capacitive touch-sensing panel.

BACKGROUND OF THE INVENTION

Based on the fact of that the 3C products are rising and developing, continuously. The input devices such as keyboard or mouse of these consumer products are replaced by the touch panel gradually. The touch panel technology provides a friendly interface to allow a user may operate a computer or electronic products more convenient and easier than ever. Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touched position detected by the detection means is sent in the form of a signal to the apparatus, which in turn performs an operation and the like displayed on the touched position. Examples of the apparatus employing such a touch panel include ATMs in banking facilities, ticket vending machines in stations, portable game machines, and the like.

Additionally, the applications of the touch panels are widely spread, the field of such devices includes but not limited to portable communication or information devices (such as personal digital assistant, PDA), electronic dictionaries, handsets, MP3s, digital players, or global positioning systems (GPSs), or other small size electronic devices, financial/commercial system, hospital register system, monitoring and control system, information system and computer assisted instruction system, etc. The convenience of operation is upgrade owing to it's friendly operation interface.

The above mentioned application usually utilizes single-touch panel or writing pad as an input device. However, the single-touch panel or writing pad only can detect a single touch-point at one time. In other words, it merely can receive or process an identification position of the touch signal at each time.

U.S. Pat. No. 4,233,522 has disclosed a capacitive touch panel comprising an array of touch sensitive switch cells. Each switch cell includes a first and a second pair of series connected capacitors energized by a common signal source, the array of switch cells being arranged so that the first pair of capacitors are connected in first groups of switch cells, such as rows, to a corresponding first plurality of signal detectors, and the second pair of capacitors are connected in second groups of switch cells, such as columns, to a corresponding second plurality of signal detectors, the junctions of each pair of capacitors of a single switch cell being selectively coupled to ground by the body or other touch capacitive means for actuating a selected switch cell.

In order to detect the location where a finger or a stylus touches the touch panel, a variety of capacitive touch panel techniques are developed. An example is U.S. Pat. No. 6,970,160, which discloses a lattice touch-sensing system for detecting a position of a touch on a touch-sensitive surface. The lattice touch-sensing system may include two capacitive sensing layers, separated by an insulating material, where each layer consists of substantially parallel conducting elements, and the conducting elements of the two sensing layers are substantially orthogonal to each other. Each element may comprise a series of diamond shaped patches that are connected together with narrow conductive rectangular strips. Each conducting element of a given sensing layer is electrically connected at one or both ends to a lead line of a corresponding set of lead lines. A control circuit may also be included to provide an excitation signal to both sets of conducting elements through the corresponding sets of lead lines, to receive sense signals generated by sensor elements when a touch on the surface occurs, and to determine a position of the touch based on the position of the affected bars in each layer.

U.S. Pat. No. 7,030,860 has disclosed a transparent, capacitive sensing system particularly well suited for input to electronic devices. The capacitive sensor can further be used as an input device for a graphical user interface, especially if overlaid on top of a display device like an LCD screen to sense finger position and contact area over the display. Furthermore, International Publication Number WO 2009/090534 A2 has disclosed "Device for quantifying an electric unbalance and touch detection system incorporating it"; and U.S. Pat. No. 8,144,132 B2 has disclosed "Multi-point sensing method for capacitive touch panel".

SUMMARY OF THE INVENTION

An object of the present invention is to provide a method for sensing a touch action on a capacitive touch-sensing panel with adjustable sensitivity and improved precision.

Another object of the present invention is to provide a circuit for sensing a touch action on a capacitive touch-sensing panel with simplified circuitry and reduced cost.

In an aspect of the present invention, a method for sensing a touch action on a capacitive touch-sensing panel is conducted by an electronic device associated with the capacitive touch-sensing panel, and comprises: continuously receiving a sense signal from the capacitive touch-sensing panel; setting or adjusting a reference signal to have a level of the sense signal be in a first relation to a level of the reference signal in an initial state, and comparing a level of the sense signal with a level of the reference signal to generate a comparison signal in a sensing state, wherein the comparison signal is outputted with a first logic level when a level of the sense signal is in the first relation to a level of the reference signal in the sensing state, and the comparison signal is outputted with a second logic level when a level of the sense signal is in a second relation to a level of the reference signal in the sensing state; and determining whether a touch action is conducted on the capacitive touch-sensing panel according to a compared result of occurrence of the first logic level and occurrence of the second logic level of the comparison signal generated within a preset time period.

In an embodiment, the first relation is that the level of the sense signal is higher than the level of the reference signal, and the second relation is that the level of the sense signal is lower than the level of the reference signal. The first logic level is a low level and the second logic level is a high level.

In an embodiment, a ratio of a duration of the occurrence of the comparison signal at the second logic level to a duration of the occurrence of the comparison signal at the first logic level is calculated within the preset time period to determine whether a touch action is conducted on the capacitive touch-sensing panel. The comparison signal is periodically sampled, and respective counts of the occurrence of the first logic level and the occurrence of the second logic level are calculated within the preset time period to determine the durations of the comparison signal at the first logic level and the second logic level, respectively.

In an embodiment, the comparison signal is periodically sampled, and a count of the occurrence of the second logic level is calculated within the preset time period to determine whether a touch action is conducted on the capacitive touch-sensing panel. A touch action is determined to be conducted on the capacitive touch-sensing panel when the count of the occurrence of the second logic level within the preset time period is greater than a threshold value.

In an embodiment, the reference signal is set to have the level of the sense signal be in the first relation to the level of the reference signal in the initial state by adjustment a capacitance of a capacitor coupled to the reference signal.

In another aspect of the present invention, a sensing circuit for sensing a touch action on a capacitive touch-sensing panel, comprises: a comparator having a first input terminal and a second input terminal for continuously receiving a sense signal and a reference signal, respectively, and generating a comparison signal according to a compared result of the sense signal and the reference signal; a variable capacitor coupled to the reference signal for adjusting a level of the reference signal; and a control circuit coupled to the comparator for determining whether a touch action is conducted on the capacitive touch-sensing panel according to the comparison signal. The level of the reference signal is optionally adjusted to have a level of the sense signal be in a first relation to the level of the reference signal in an initial state, and a level of the sense signal is compared with the level of the reference signal to generate the comparison signal in a sensing state, wherein the comparison signal is outputted with a first logic level when a level of the sense signal is in the first relation to the level of the reference signal in the sensing state, and the comparison signal is outputted with a second logic level when a level of the sense signal is in a second relation to the level of the reference signal in the sensing state.

In a further aspect of the present invention, a touch control device comprises: a capacitive touch-sensing panel where a touch action is conducted; and a sensing circuit for sensing a touch action on the capacitive touch-sensing panel as recited above.

The invention will become more readily apparent to those ordinarily skilled in the art after reviewing the following detailed description and accompanying drawings.

DETAILED DESCRIPTION OF PREFERRED EMBODIMENTS

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Further, the scope of the present invention is expressly not limited to any particular embodiments except what is specified in the appended Claims.

A touch control device according to the present invention includes a capacitive touch-sensing panel where a touch action is conducted; and a sensing circuit for sensing a touch action on the capacitive touch-sensing panel. The touch control device, for example, can be tablets, personal digital assistants, cellular phones, smart phones, tablets, PC peripherals, points of sales, etc. Examples of the capacitive touch-sensing panel and embodiments of the sensing circuit will be described hereinafter.

Figure 1A:
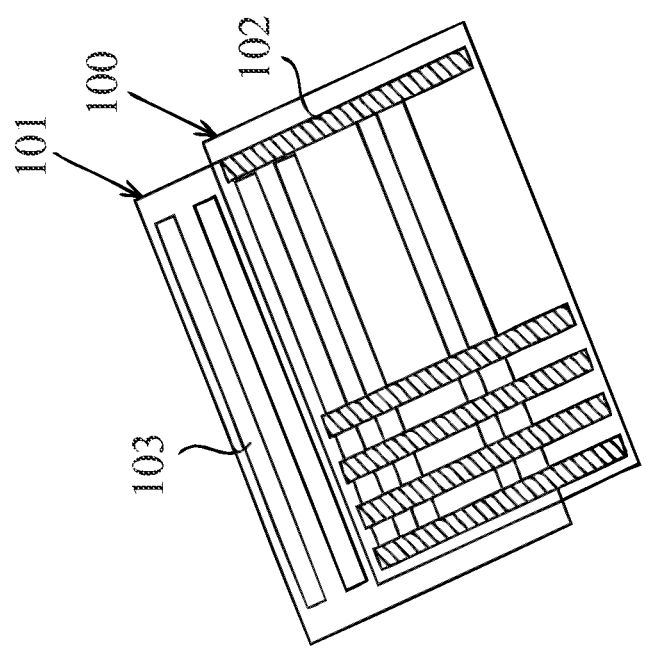
FIG. 1A illustrates a double-side ITO bar type capacitive touch-sensing panel.

Referring to FIG. 1A, a double-side ITO bar type capacitive touch-sensing panel is shown. The capacitive touch-sensing panel includes a top layer 100 and a bottom layer 101. The top layer 100 includes multiple touch-sensing patterns 102 formed on a top substrate (or film), and the bottom layer 101 includes multiple touch-sensing patterns 103 formed on a bottom substrate (or film). The multiple touch-sensing patterns 102 and 103 are a touch-sensing layer, which may be formed by an indium tin oxide (ITO) layer or an inductive electrode layer to form multiple inductive electrode patterns. The touch-sensing patterns may be formed by a photolithography and etching process, or a printing process. The multiple touch-sensing patterns 102 and 103 are bar-shaped sensor elements and arranged in parallel, respectively. The multiple touch-sensing patterns 102 and 103 are configured in perpendicular from with each other to construct a double-side ITO bar type touch-sensing patterns.

The thickness of the ITO layer on the substrate is preferably within a range from 50 to 300 nm. A cover portion has a touch-sensing function configured on an external side of an electronic device for providing the touch-sensing function and protecting the electronic device. In general, the ITO film obtained by doping tin to Indium oxide may be employed as an electrode material of a capacitive touch-sensing panel.

The ITO film in the amorphous state has an etching rate greater than that of a polycrystalline ITO film when etching is performed to pattern it into a desired shape, for example, by wet etching with a mixture etching solution of hydrochloric acid and nitric acid. Therefore, for example, when, as described below, the ITO film is used as a pixel electrode of a liquid crystal display device, the formed amorphous ITO film can be etched in a short time to obtain a desired pixel electrode pattern. For example, when an electrode which need not be patterned separately such as a common electrode of the liquid crystal display device, is etched by removing the periphery of the substrate, the etching can be performed in a short time by first forming the ITO film in the amorphous state as described above. Even when the etching is not required, it may be configured to form the amorphous ITO film and then to perform the thermal treatment for polycrystallization in order to improve the film quality.

The amorphous ITO film formed at room temperature in the water added atmosphere as described above has high resistance and low light transmittance. Accordingly, it may adopt a thermal annealing treatment under conditions to treat the aforementioned amorphous ITO film so to produce the polycrystalline ITO film having low resistance and high transmittance.

A crystalline ITO layer may be formed on top of a substrate by heating ITO to a high temperature while limiting a temperature increase of the substrate to less than a predetermined temperature. For example, a layer including amorphous ITO may be deposited on top of the substrate, and a surface anneal process may be used to cause the ITO to undergo a phase conversion from amorphous ITO to crystalline ITO. The layer including amorphous ITO may be, for example, a layer including both amorphous ITO and crystalline ITO. In the surface anneal process, energy is applied in such a way that most of the energy is absorbed by the layer including amorphous ITO, and not the substrate. For example, the amorphous ITO layer may be exposed to laser light, ultraviolet (UV) radiation, microwave radiation, or other electromagnetic (EM) radiation. The wavelength of the radiation can be chosen such that the amorphous ITO layer absorbs most of the energy of the radiation. In this way, for example, the amorphous ITO layer may be sufficiently heated to undergo the phase conversion to crystalline ITO while the temperature increase of the substrate can be limited, since most of the energy is absorbed by the ITO layer. In another example, energy absorption can be focused on the ITO layer by applying an electrical current to the ITO layer. The electrical resistance of the ITO layer causes some of the energy of the electrical current to be absorbed by the ITO layer in the form of heat. Focusing the flow of the electrical current through the ITO layer can allow most of the energy to be absorbed by the amorphous ITO layer, thus heating the ITO to high temperature and causing phase conversion to crystalline ITO, while limiting the temperature increase of the substrate to less than a predetermined temperature.

In another example, crystalline ITO may be deposited on a bare substrate (i.e., without a layer including amorphous ITO) using a deposition process, such as physical vapor deposition (PVD), that heats ITO to high temperature (e.g., 200-350 degrees C. or higher) while limiting the temperature increase of the substrate to less than a predetermined temperature. For example, the substrate may be passed through a high-temperature ITO deposition chamber quickly, before the temperature of the substrate increases beyond a predetermined threshold temperature, to deposit a thin layer of crystalline ITO. The substrate can be passed through the chamber multiple times until the ITO layer reaches a desired thickness. Forming a crystalline ITO layer on top of a substrate while limiting a temperature increase of the substrate may be particularly useful in the production of LCD touch screens, for example, since the liquid crystal of the LCD can degrade if exposed to temperatures beyond approximately 100 degrees C. In this regard, the following example embodiments of the invention are described and illustrated herein in terms of LCD touch panel. However, it should be understood that embodiments of this invention are not so limited, but are additionally applicable to other applications in which a crystalline layer of ITO is formed on top of a temperature sensitive substrate and/or near a temperature sensitive material. It should also be noted that embodiments of this invention are also applicable to the formation of crystalline ITO on substrates in general, that is, even when there is no particular temperature sensitivity of the substrate or surrounding materials.

Figure 1B:
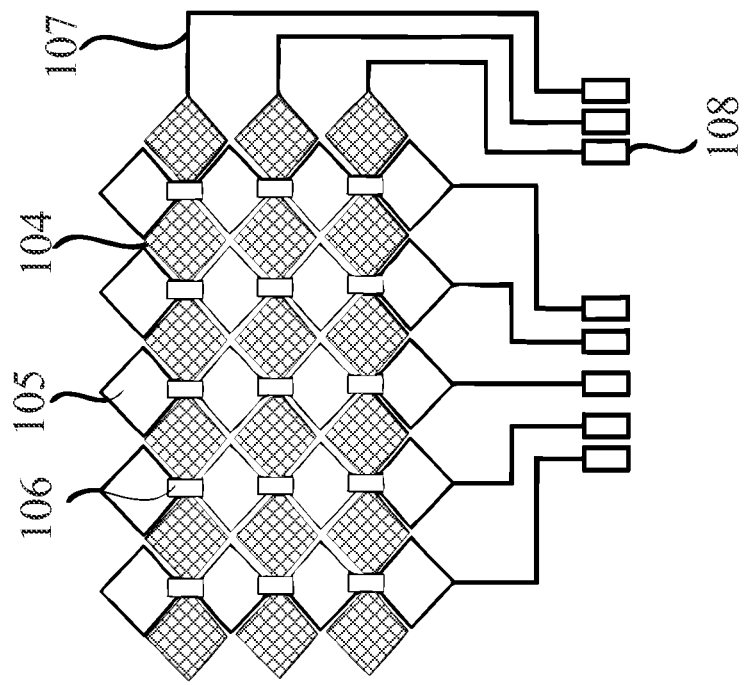
FIG. 1B illustrates a signal-side ITO diamond type capacitive touch-sensing panel.

In another example, referring to FIG. 1B, it shows a signal-side ITO diamond type capacitive touch-sensing panel. The capacitive touch-sensing panel may have any suitable configuration to detect touch via capacitance change. The capacitive touch-sensing panel includes multiple first touch-sensing patterns (inductive electrode patterns) 104 and multiple second touch-sensing patterns 105 regularly formed on a substrate, respectively. The multiple first touch-sensing patterns 104 comprises a plurality of rows of sensor elements, and the multiple second touch-sensing patterns 105 comprises a plurality of columns of sensor elements, that together form a plurality of pixels each being configured to detect touch at a location on the body over the pixel. Each sensing pixel can be associated with an area for which the sensing pixel is intended to detect touch events. The rows of sensor elements are separated from the columns of sensor elements via a dielectric layer 106. In one embodiment, each sensor element has a rectangular shape that is connected with adjacent sensor elements in the same row or column at opposite corners. However, it will be appreciated that a sensor element may have any other suitable shape than that shown. Similarly, the multiple touch-sensing patterns 104 and 105 are a touch-sensing layer, which may be formed by an transparent conductive layer, such as an indium tin oxide (ITO), indium zinc oxide (IZO), or Indium Tin Zinc Oxide (ITZO) layer, and for example formed by PVD, or an inductive electrode layer to form multiple inductive electrode patterns. An exemplary thickness of the transparent conductive layer is about 50 nm. For example, in this embodiment, the multiple first and second touch-sensing patterns 104, 105 are arranged in an array closely to construct a single-side ITO diamond type touch-sensing patterns. Each touch-sensing patterns 104, 105 is connected to a line (lead) 107 and subsequently connected to a control chip (not shown) on a control circuit board via the line 107.

An area of each of the touch-sensing patterns 104, 105 is substantially equal to one another. In order to present in a concise manner, merely part of the lines 107 are shown in the drawing. The lines 107 can be made of metal material or indium tin oxide (ITO). One end of the line 107 is connected to the first and second touch sensor pattern 104, 105 and the other end of the line 107 is connected to a connector 108, wherein the connector 108 is coupled to the control chip on the control circuit board which can be made of flexible printed circuit (FPC) or printed circuit board (PCB).

Figure 2:
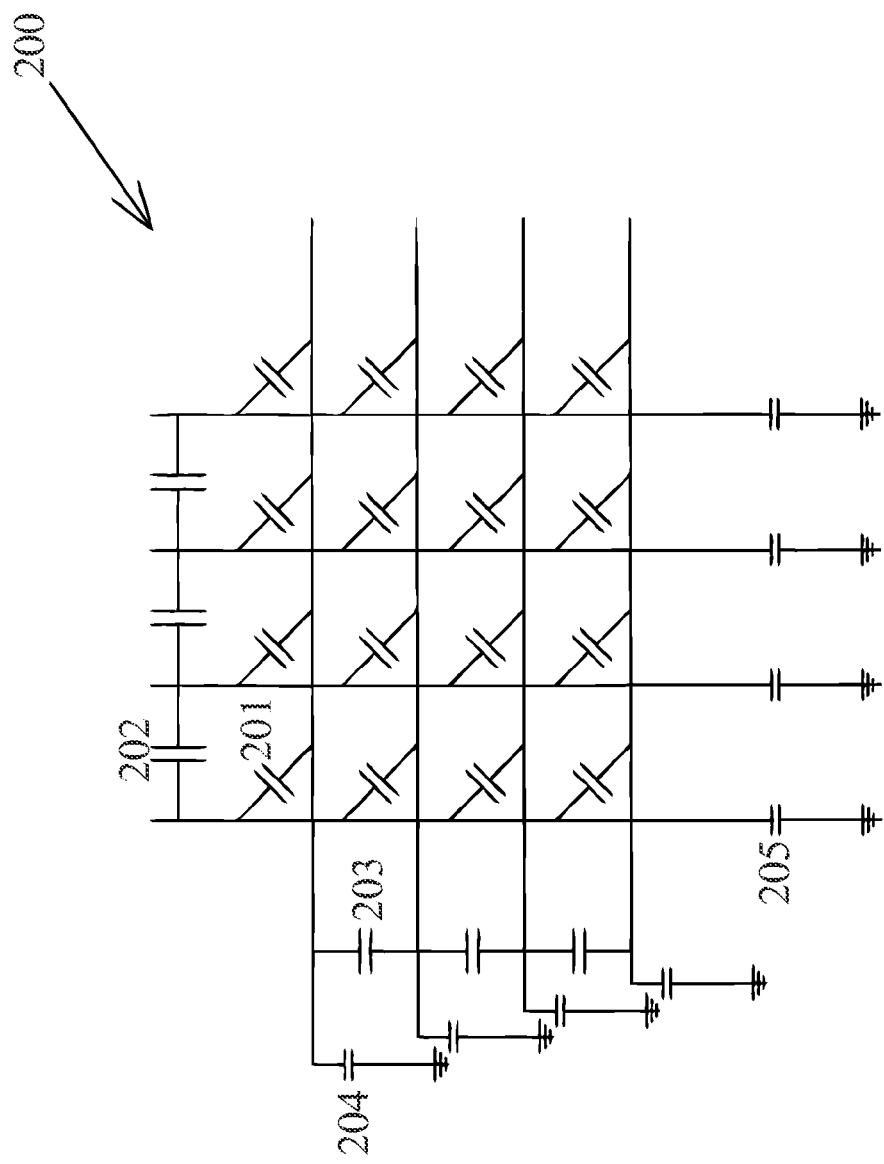
FIG. 2 illustrates a capacitance scheme of matrix electrodes.

Considering the sensing speed and the identification of touching locations, the matrix type is commonly used for its effectiveness. Referring to FIG. 2, the capacitance scheme of matrix electrodes is illustrated. The matrix electrodes 200 are scanned adjacently or by the cross nodes to discover if any touch signal is on the touch sensor. Any suitable sensor size and number of sensor elements may be used. For example, in some embodiments, a sensor area of approximately 100 mm.times.50 mm may be used. In one embodiment, such touch sensor having m×n sensor elements may have a number of columns and rows equal to (m+n), and (m+n) capacitance measurements yield a full readout of the sensor. However, in this embodiment, if a user is touching multiple rows and/or multiple columns at one time, some ambiguity may exist about the location of the touch. As illustrated in FIG. 2, this ambiguity may be overcome to some degree by the use of multiple capacitances 204 and 205 to ground in each row and/or each column of the sensor elements. Furthermore, the periphery of the touch sensor is configured by multiple auxiliary capacitances 202 and 203 in each row and/or each column of the sensor elements. If the capacitance 201 from one sensor element to another sensor element is touched, then m×n measurements may be made, as the capacitance 201 may be measured from each row to each column. In this case, it is possible to resolve each touch location independently where a touch occurs over multiple columns and/or multiple rows.

Figure 3:
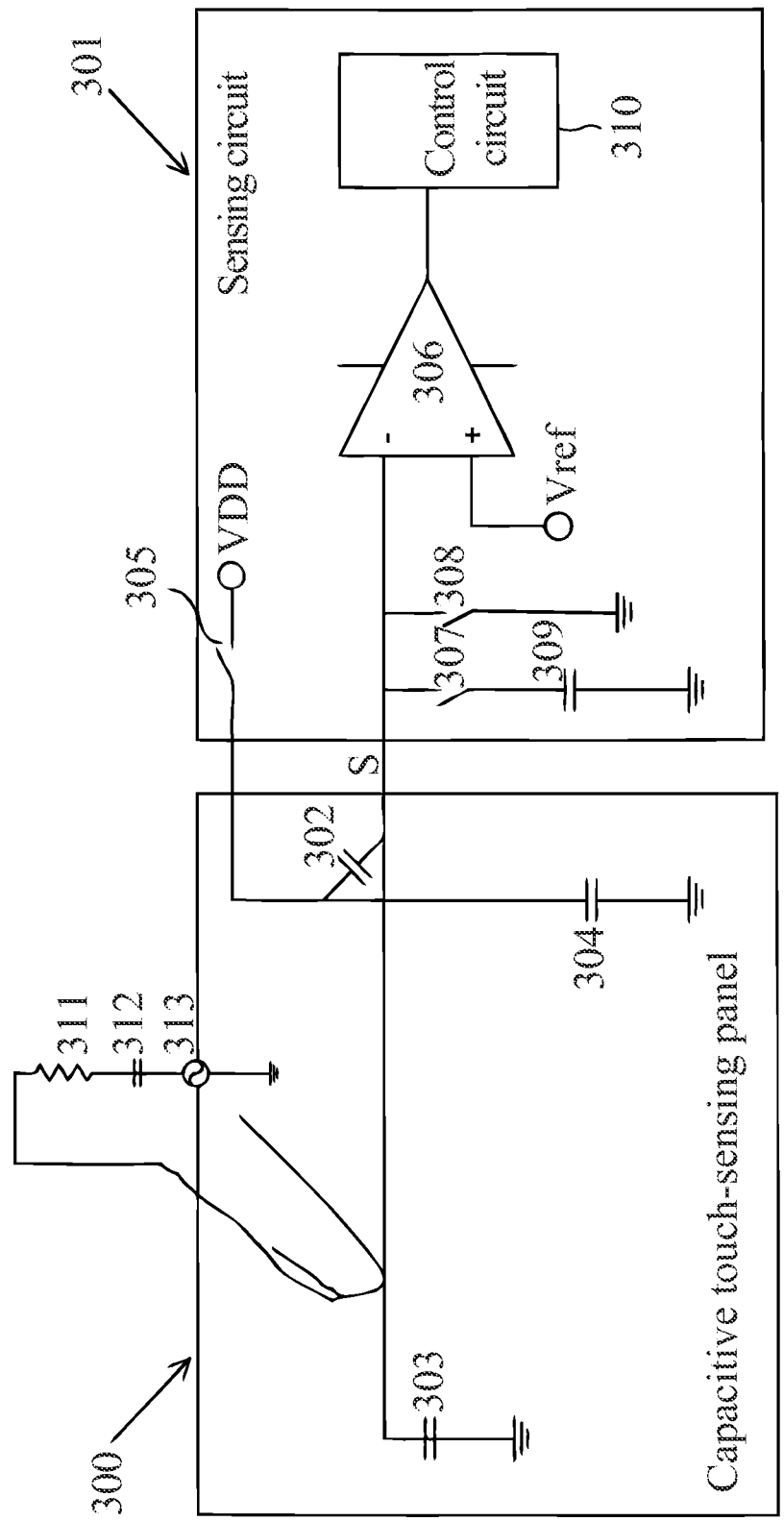
FIG. 3 illustrates a simplified electrodes sensing model.

Referring to FIG. 3, it shows the simplified electrodes sensing model. In this example, the electrodes 300 are connected to the sensing circuit 301 during the scanning by using the charge-transfer method. In the electrode 300, the capacitances 303, 304 are grounded in the sensor element. The capacitance 303 is mounted on a path S (sense line). The capacitance 304 is located on a vertical line. The capacitance 302 is a sensing capacitance, coupled to the path S and the vertical line. One terminal of the sensing capacitance 302 is connected to a switch 305 of the sensing circuit 301 via the vertical line. The input path S is applied on an input (negative terminal) of a comparator or amplifier circuit 306. The positive terminal of the comparator 306 is coupled to a stored preset reference voltage (Vref). The third terminal of the comparator 306 is coupled to a control circuit 310. This sensing circuit 301 thus comprises switches 305, 307, 308, a comparator or amplifier circuit 306, and a control circuit (unit) 310. The control circuit 310 may be used for applying a digital command for switching the switches 307, 308. One terminal of the switches 307, 308 is mounted in parallel on the path S, another terminal of the switches 307, 308 is coupled to a capacitance 309 and grounded, respectively. Then, the capacitance 309 is a reference capacitance which is grounded. The comparator 306 may be performed a comparison between VDD and the stored preset reference voltage (Vref). Such the sensing circuit 301 thus performs the conversion of a value of the capacitance 302 present on the path S into an indication of the digital value corresponding to said value of the capacitance 302 seen by the input path S. When there is no finger touch, the sensing capacitance 302 is only the capacitance from the electrode scheme viewed from the sensing circuit 310. When the finger is touching, the capacitance viewed from the sensing circuit 310 becomes the sensing capacitance 302 plus an induced capacitance 312 by the finger. The finger with an intrinsic resistance 311 may produce a noise signal 313 when touch the electrode 300.

Figure 4:
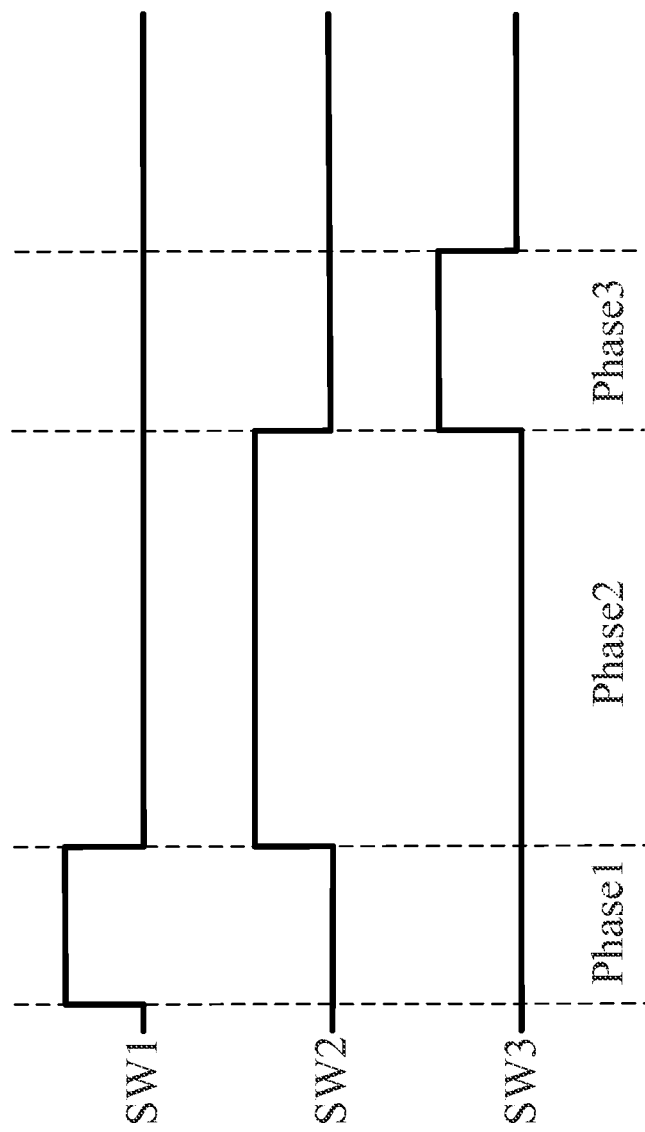
FIG. 4 illustrates a timing diagram of the electrodes sensing model.
Figure 5:
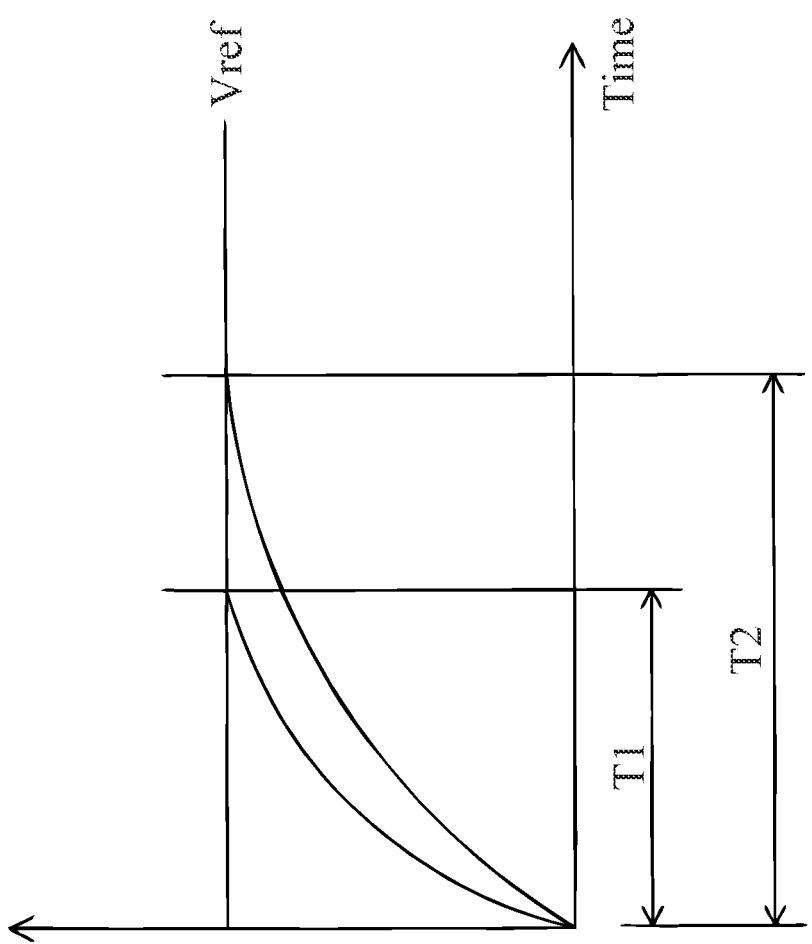
FIG. 5 illustrates a charge time with different capacitances.

The sensing method of the electrodes sensing model is explicitly explained from the following timing diagram, shown in FIG. 4. The sensing process may be included three phases. In phase 1, the switch 305 (SW1) is close, the switch 307 (SW2) is open, and the switch 308 (SW3) is open. Meanwhile, the sensing circuit 301 sends the VDD to the sensor electrode 300 as the charging process. In phase 2, the switch 305 (SW1) is open, the switch 307 (SW2) is close, and the switch 308 (SW3) is open. Then, the accumulated charge on the sensor electrode 300 is transferred to the internal capacitor for the measurement. In phase 3, the switch 305 (SW1) is open, the switch 307 (SW2) is open, and the switch 308 (SW3) is open. Accordingly, the charge is released from the internal capacitor and prepared for the next charge to the sensor electrode 300. In the phase 2, the charged electrode transfers the capacitance into the voltage for the measurements. When the finger is touching, the total capacitance is the sensing capacitance 302 plus the induced capacitance 312, which is larger than that of the sensing capacitance 302 without the finger touch. The transferred voltage is compared to the pre-stored reference voltage (Vref). It takes longer to reach the Vref when the total capacitance is larger. Therefore, a finger touch can be identified if the charge time is more than a defined period. In FIG. 5, the T2 could be recognized as the time of the finger touch in the charge-transfer process. T1 is the time in the charging process without finger touch. FIG. 5 shows a charge time with different capacitances.

Figure 6:
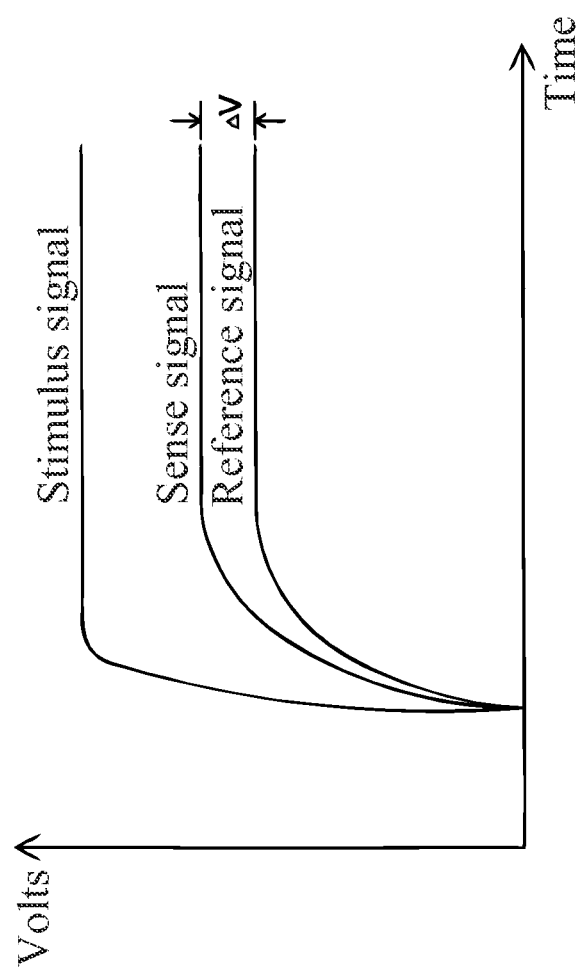
FIG. 6 illustrates the sense signal and the reference signal after stimulating.
Figure 7:
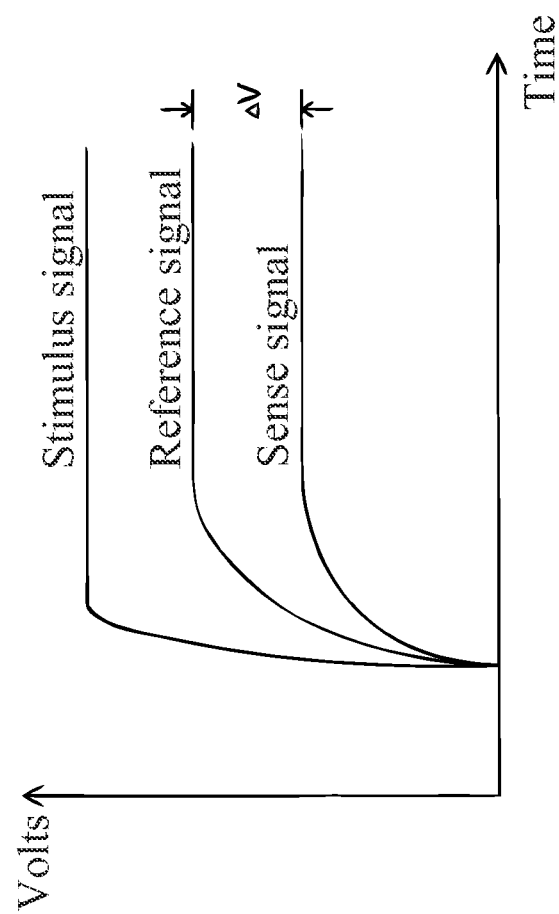
FIG. 7 illustrates the sense signal and the reference signal after touching under stimulus.

In simplified circuit, the touch sensor has an array of the sensor elements to yield a full readout of the sensor. On one dimension (column or row), one electrode is defined as the sense electrode where the finger is touched, and the adjacent electrode is defined as the reference electrode with the driving signal from the electrode on the other dimension (column or row). A sense signal may be produced by the sense electrode, and a reference signal may be created by the reference electrode. FIG. 6 shows the sense signal and the reference signal after stimulating. Due to the variations of the sense electrode (such as ITO electrode) manufacture process, the traces between the sensing circuit (sensor IC) and the sense electrode (ITO sensor), the internal IC manufacture process and the external environment, there is a balance circuit to compensate the offset with the internal capacitors for the variation on the inputs to the comparator. The $\Delta V$ is considered as the offset ($\Delta V_{offset}$) which represents the combined intrinsic characteristic from the variations above, shown in FIG. 6. When the sense line is touched with the finger, the unbalance offset between the sense line and the reference line is increased as shown in FIG. 7. FIG. 7 shows the sense signal and the reference signal after touching under stimulus, wherein the $\Delta V$ is considered as the ($\Delta V_{offset} + \Delta V_{finger}$) larger than the offset ($\Delta V_{offset}$).

To detect such touch signal, a quantifying circuit is used to calculate the charged $\Delta V$ and the respective $\Delta V_{finger}$. This surely increases the cost of the sensor circuit (IC). The noise information from the external environment could not be handled without looping the 2$^{nd}$ matrix scan. Thus, another electrode sensing scheme is provided for the present invention, which the same electrode matrix scheme is used for connecting to the simplified sensing circuit and the control circuit (unit), as shown in FIG. 8.

Figure 8:
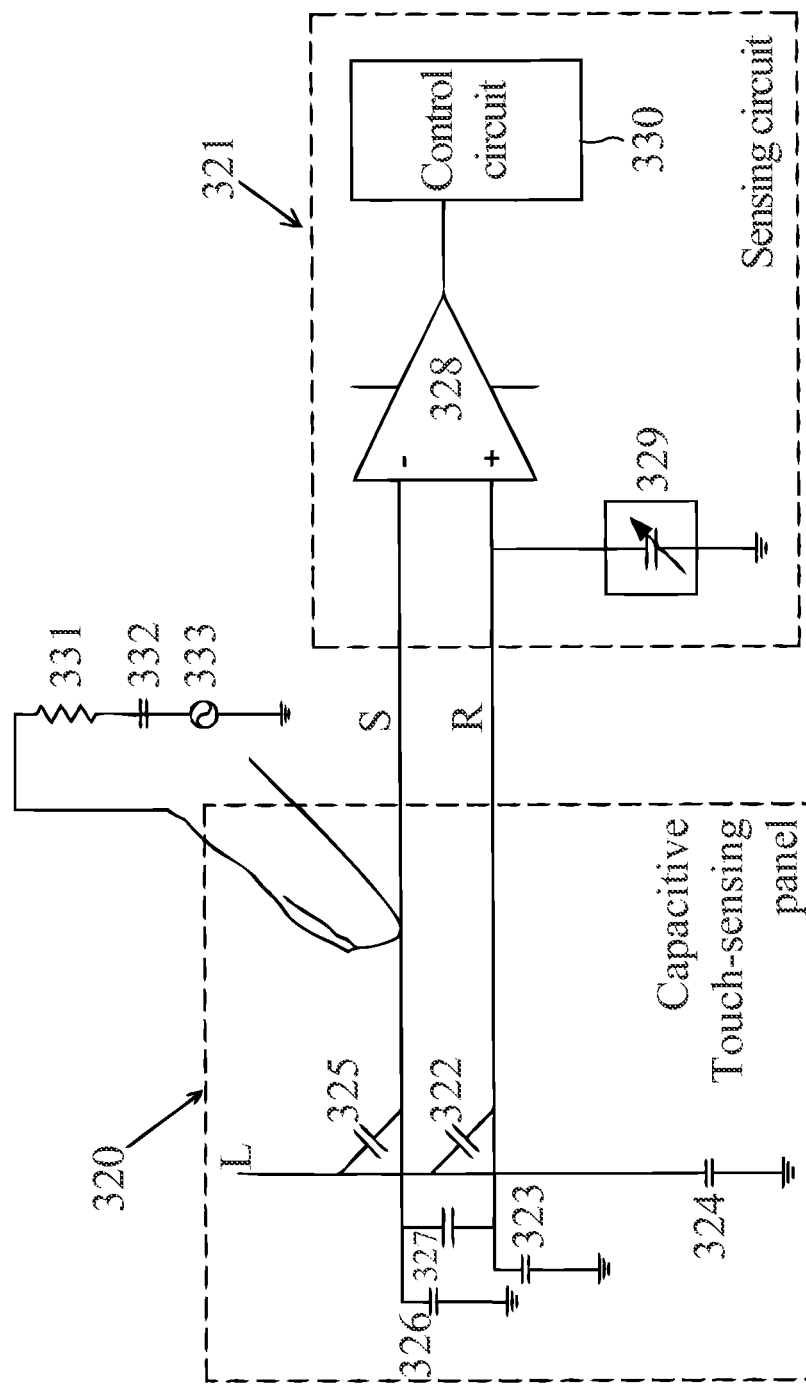
FIG. 8 is a schematic circuit block diagram illustrating a touch control device according to an embodiment of the present invention.

Referring to FIG. 8, a sensing circuit according to an embodiment of the present invention is schematically illustrated. The sensing circuit 321 is coupled to the capacitive touch-sensing panel 320 for sensing a user's touch action on the capacitive touch-sensing panel 320. Capacitors 326 and 323 of the capacitive touch-sensing panel 320 are grounded. The capacitor 326 is coupled to a sense line in a detection path S. The capacitor 323 is coupled to a sense line in a reference path R. The capacitor 327 is located between the sense path S and the reference path R. The capacitor 325 is a sensing capacitor, coupled to the path S and a vertical line L. The capacitor 322 is a reference capacitor, coupled to the path S and the vertical line L. A capacitor 324 is coupled to the vertical line L and ground. A sense signal is continuously inputted through the path S into an input end (e.g. negative terminal) of a comparator or amplifier circuit 328, while a reference signal is inputted through the path R into another input end (e.g. positive terminal) of the comparator or amplifier circuit 328. Moreover, the positive terminal of the comparator 328 is further coupled to a variable capacitor 329, which is grounded at another end. The output end of the comparator 328 is coupled to a control circuit 330. In this embodiment, the comparator or amplifier circuit 328, the variable capacitor 329 and the control circuit 330 constitute a sensing circuit 321.

Due to the variation from the manufacture process and the environment conditions, the output of the comparator 328 cannot be fixed to 0 or to 1 from every electrode scan as the variation could be so small and be influenced from the environment noise or the human body noise. In order to have a consistent initial status (without finger touch) for every electrode scan, the output of the comparator 328 is fixed to either "0" or "1" state. This can be done by controlling the variable capacitor 329 which is connected to the reference line R prior to the input terminal of the comparator 328. The setting of this variable capacitor 329 is called the reference value (preset value). This reference value can be adjusted from the control circuit 330 based on the input signal noise 333. When the finger is touching, the capacitance viewed from the sensing circuit 320 becomes the sensing capacitance 332 plus an induced capacitance 325 by the finger. The finger with an intrinsic resistance 331 may produce a noise signal 333 when touching the electrode 320.

Figure 9:
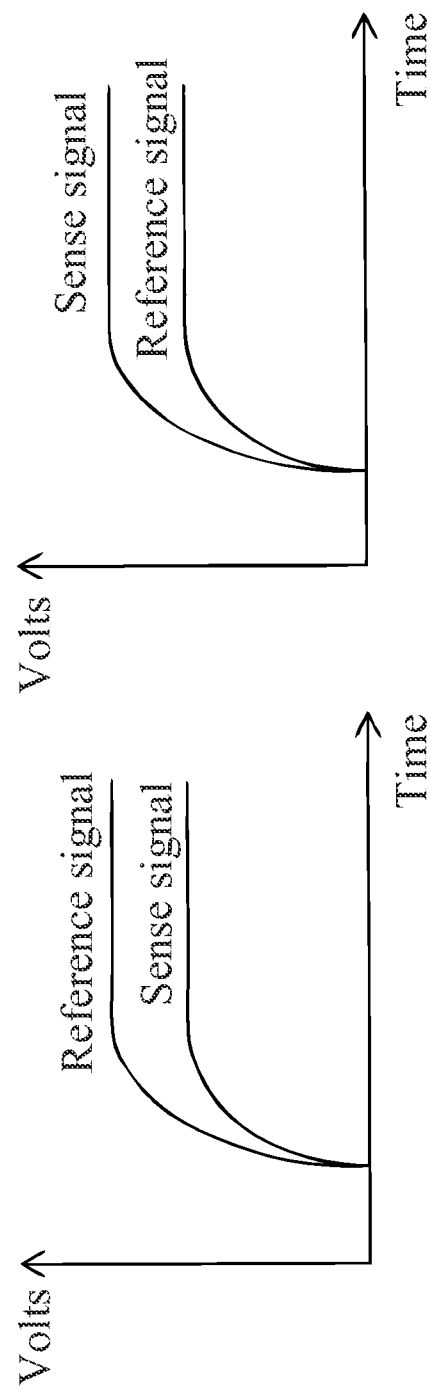
FIGS. 9A and 9B are voltage vs. time plots exemplifying level adjustment of a reference signal to be performed in an initial state of a sensing method according to an embodiment of the present invention.

Therefore, according to the present invention, in an initial state before any sensing operation for touch action is performed, the inputted sense signal is compared with the reference signal by the comparator 328, and then the comparator 328 outputs a comparison signal indicating the compared result. The control circuit 330 sets the variable capacitor 329 or adjusts the variable capacitor 329 if the compared result shows that the level of the sense signal is lower than the level of the reference signal, as shown in FIG. 9A. In the initial state, the reference signal is to be intentionally adjusted to be lower than the sense signal for subsequent sensing operations for touch actions, as shown in FIG. 9B.

Afterwards, a sensing state is entered. In the sensing state, the sense signal is continuously inputted into the comparator 328 to be compared with the adjusted reference signal. According to a sensing method of the present invention, a level of the sense signal received in the sensing state of the capacitive touch-sensing panel is compared with the level of the reference signal, thereby generating a comparison signal. As shown, the comparison signal is outputted with a first logic level, e.g. a logically low level, when a level of the sense signal is in the first relation to, e.g. higher than, the level of the reference signal. On the other hand, the comparison signal is outputted with a second logic level, i.e. a logically high level, when a level of the sense signal is in a second relation to, e.g. lower than, the level of the reference signal. According to a compared result of occurrence of the first logic level and occurrence of the second logic level of the comparison signal generated within a preset time period T, whether a touch action is conducted on the capacitive touch-sensing panel can be determined, which will be described in more detail hereinafter.

In an embodiment of the sensing method according to the present invention, whether a touch action is conducted on the capacitive touch-sensing panel is determined based on a ratio of a duration of the occurrence of the comparison signal at the second logic level to a duration of the occurrence of the comparison signal at the first logic level is calculated within the preset time period T. By properly setting a threshold of the ratio of the durations, whether a touch action is conducted on the capacitive touch-sensing panel can be determined. For example, referring to FIG. 10, the comparator output, which is a single wave (pulse), reveals a lower ratio indicating that the received sense signal is a noise. On the other hand, the comparator output in FIG. 11 reveals a higher ratio indicating that the received sense signal is an actual touch sense signal.

Figure 10:
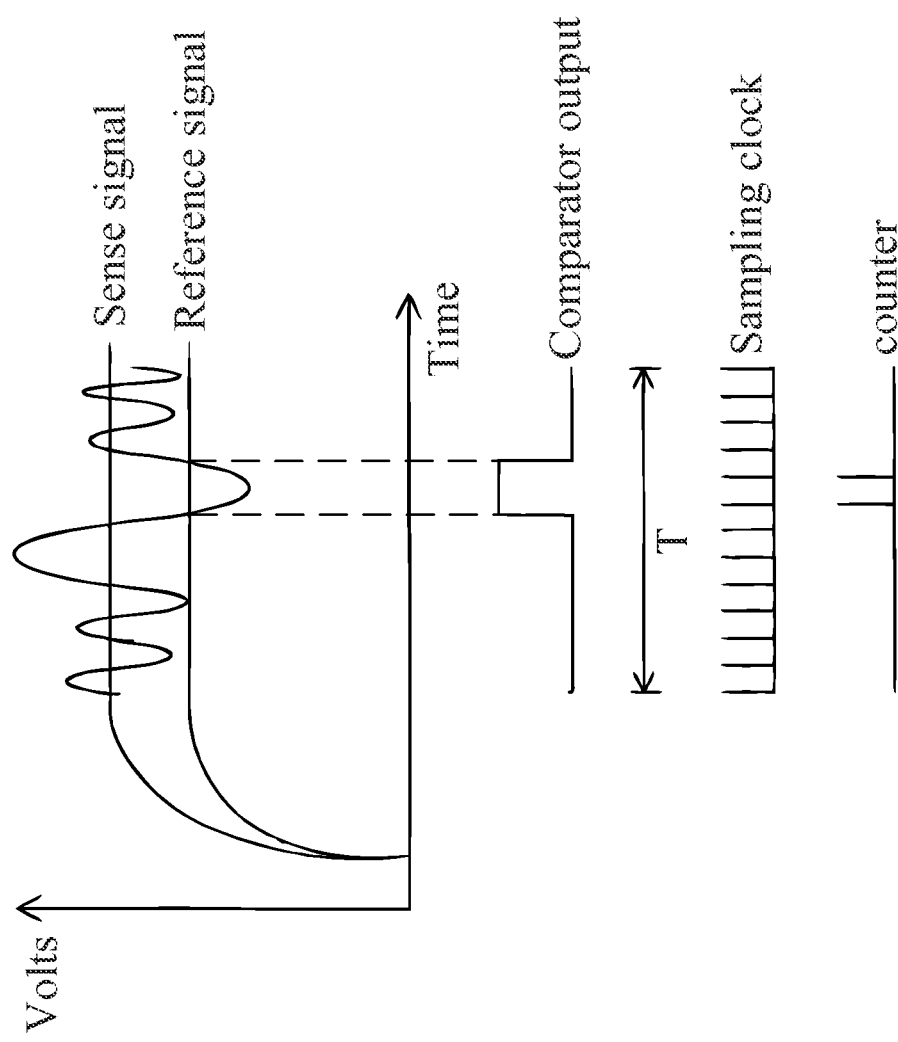
FIG. 10 is voltage vs. time plot exemplifying level changes of a sense signal detected in a sensing state of a sensing method according to an embodiment of the present invention, which reveals the current sense signal is a noise and no touch action is actually performed.
Figure 11:
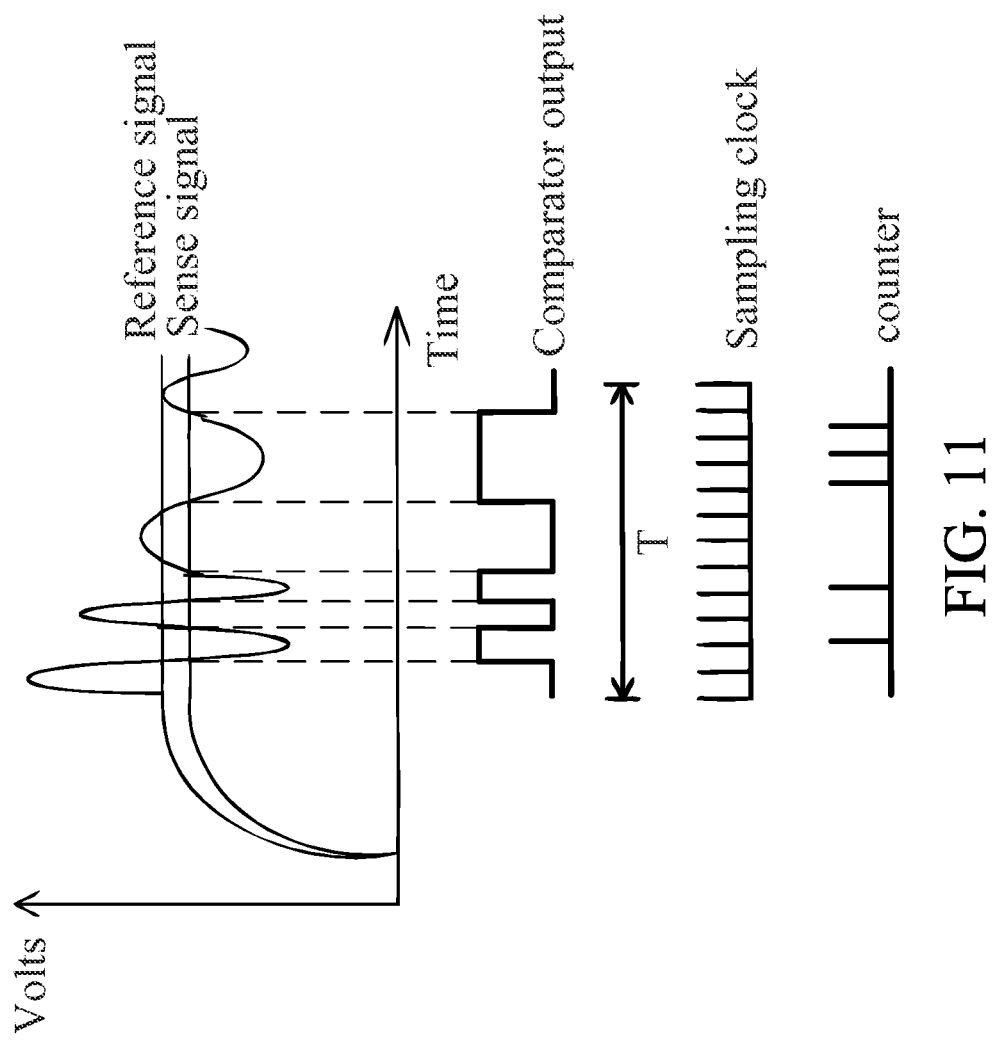
FIG. 11 is voltage vs. time plot exemplifying level changes of a sense signal detected in a sensing state of a sensing method according to the embodiment of FIG. 10, which reveals the current sense signal is a touch sense signal and a touch action is actually performed.

Alternatively, the duration of the occurrence of the comparison signal at the first logic level or the second logic level can be estimated according to the output of the counter, as shown in FIGS. 10 and 11. Since the comparison signal is periodically sampled, respective durations of the occurrence of the first logic level and the occurrence of the second logic level are proportional to respective counts of the occurrence of the first logic level and the occurrence of the second logic level. Therefore, the ratio of the counts may indicate the ratio of the durations.

In another embodiment of the sensing method according to the present invention, whether a touch action is conducted on the capacitive touch-sensing panel is determined based on a count of the occurrence of the second logic level within the preset time period T. A touch action is determined to be conducted on the capacitive touch-sensing panel when the count of the occurrence of the second logic level within the preset time period is greater than a threshold number. By properly setting a threshold of the count, whether a touch action is conducted on the capacitive touch-sensing panel can be determined. For example, referring to FIG. 10, the counter output reveals a lower count indicating that the received sense signal is a noise. On the other hand, the counter output in FIG. 11 reveals a higher count indicating that the received sense signal is an actual touch sense signal.

It is to be noted that the term "occurrence" of a logic state used herein means the detection of the logic state at a sampling point within the preset time period T. The term "duration of occurrence" of a logic state means the overall period of time during which the logic state is detected at consecutive sampling points within the preset time period T. The term "count of occurrence" of logic state used herein means the consecutively accumulated number of the logic state at consecutive sampling points within the preset time period T.

In this sensing scheme, the sensor circuit (IC) 321 is simplified without the quantization circuit.

Figure 12:
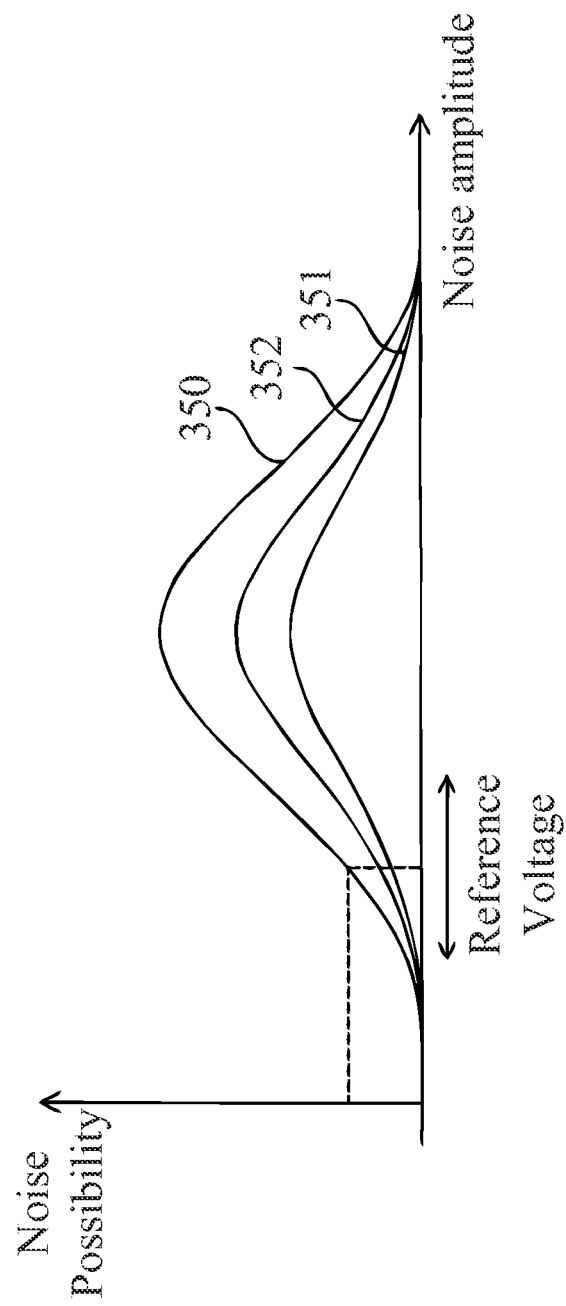
FIG. 12 illustrates a normal distribution for the noise model.
Figure 13:
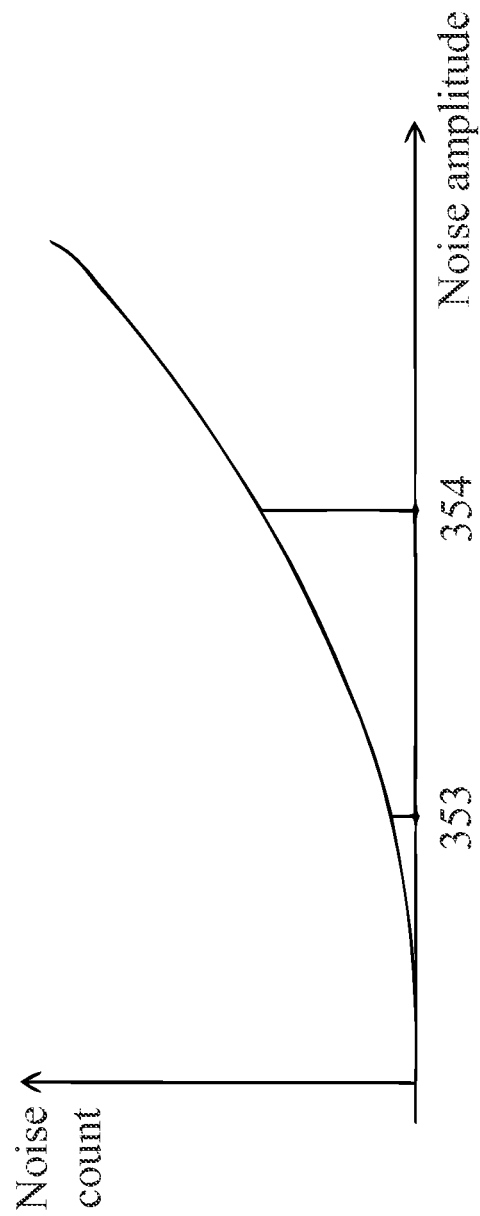
FIG. 13 illustrates a reference value and a switching threshold value.

In FIG. 12, the possibility of noise is considered as the normal distribution in terms of the peak to peak noise amplitude. The curves 350, 352, 350 of the possibility of noise are determined as large capacitance, middle capacitance and small capacitance, respectively. The larger capacitance is, and the larger possibility of noise is. The noise possibility is transferred to the noise count after performing by the comparator 328 and sampling process in the control circuit 330, shown in FIG. 13. The reference value 353 is set according to the lower limit where the noise count is kept at the low value as the initial state when there is no touch. When the finger is touching, the noise level (count) is increased along with the finger signal level is increased. The noise count is set as the switching threshold value 354 for the identification of the finger touches. FIG. 13 depicts the reference value (voltage) and the switching threshold value (voltage).

A calibration process is preferably performed by sweeping the reference level to have the following purposes; a). To set the reference level for the initial state; b). To set the threshold value for the switching counter. The counter value is based on the sampled signal level. When the counter value is high, it means the sampled signal is intensive, strong and high, and vice versa. Therefore, the circuit sensitivity for the touching signal can be adjustable when the reference level of the initial state and the switching threshold value are adjusted.

Figure 14:
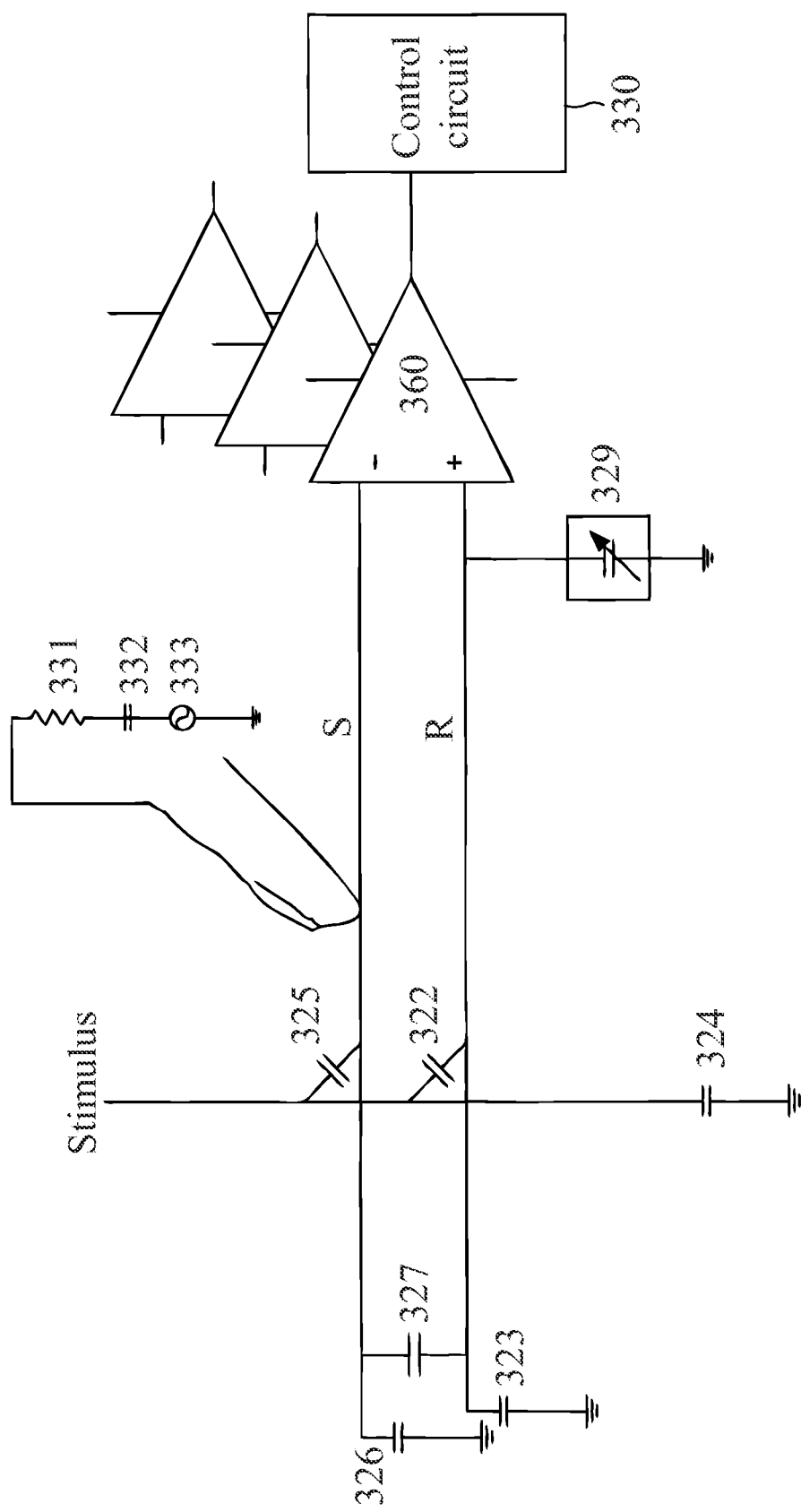
FIG. 14 illustrates a group sensing scheme.
Figure 15:
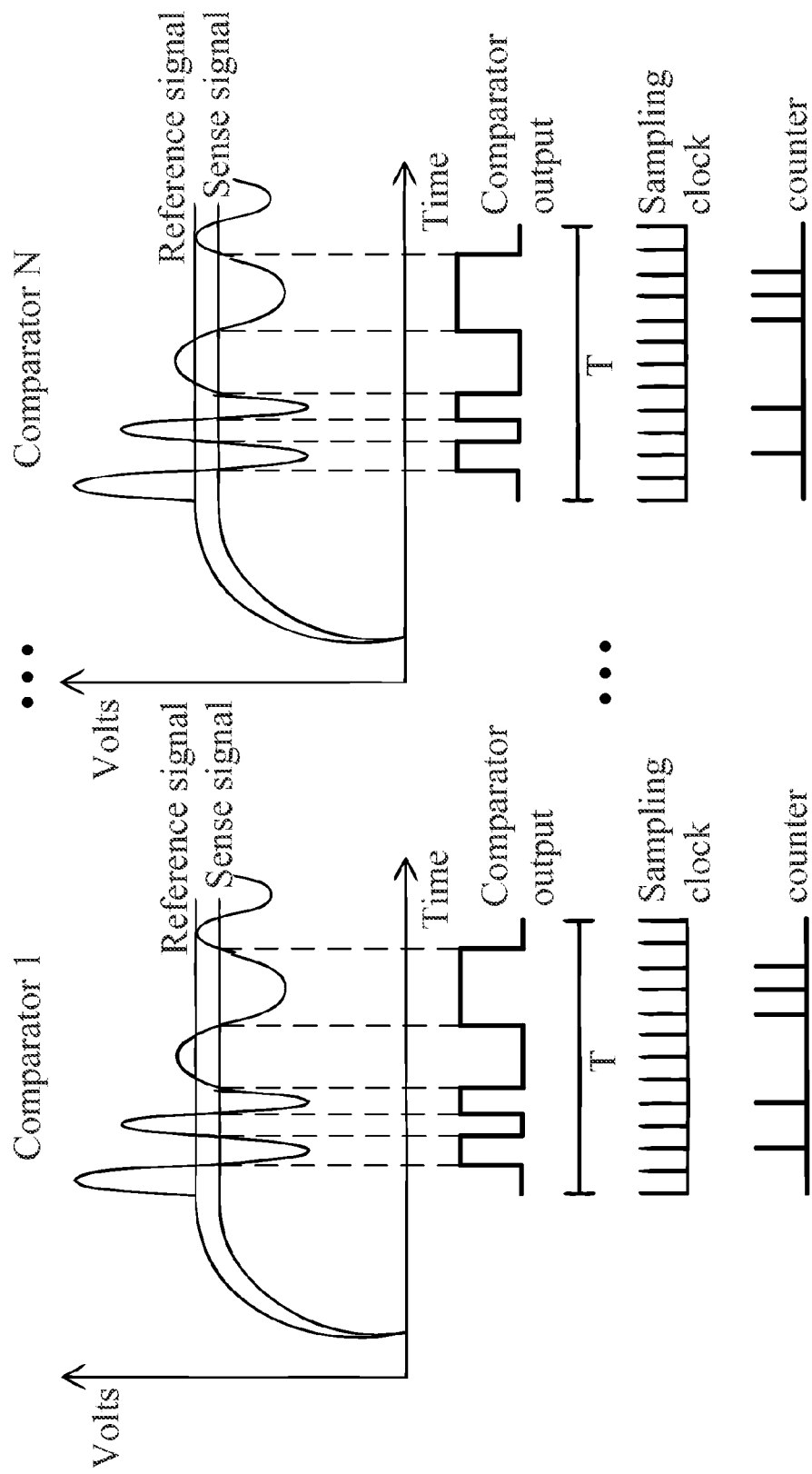
FIG. 15 illustrates a noise impact from the group sensing scheme.

In another aspect, global noise filtering can be done by using a group of comparators 360 to detect the sense signals at the same time, as shown in FIG. 14. FIG. 14 shows a group sensing scheme. The number of the comparators 360 and the related circuits are depending on the actual hardware implementation. The idea here is to implement the global noise filtering by identifying the same or similar noise pattern on the several sensing circuits when they are sensing the touch signals at the same time. Take one finger touch on one electrode as an example, suppose only one sense line (S) is sensed with finger signal and the sensed comparator is switched to another direction. From a group sensing, if all comparators 360 show the same behavior, e.g. switching to another direction, with a great chance, the changes may be from the impact of the global noise, instead of the single finger signal. FIG. 15 shows a noise impact from the group sensing, wherein comparator 1 and comparator N have the same behavior and noise pattern.

From the practical world, the noise over the signal is the natural characteristics in the electrical circuit. By handling this characteristic, the following targets including sensing circuit, adjustable sensitivity and global noise filtering, are meant to be realized on the capacitive touch panel as illustrated in the above-mentioned.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A method for sensing a touch action on a capacitive touch-sensing panel, being conducted by a sensing circuit associated with the capacitive touch-sensing panel, and comprising:
   continuously receiving a sense signal from the capacitive touch-sensing panel;
   setting or adjusting a level of a reference signal according to the sense signal received in an initial state of the capacitive touch-sensing panel to have a level of the sense signal, when compared with the reference signal, be in a first relation to the level of the reference signal;
   comparing a level of the sense signal received in a sensing state of the capacitive touch-sensing panel with the level of the reference signal to generate a comparison signal, wherein the comparison signal is outputted with a first logic level when a level of the sense signal is in the first relation to the level of the reference signal, and the comparison signal is outputted with a second logic level when a level of the sense signal is in a second relation to the level of the reference signal; and
   determining whether a touch action is conducted on the capacitive touch-sensing panel according to a compared result of occurrence of the first logic level and occurrence of the second logic level of the comparison signal generated within a preset time period.

2. The method according to claim 1, wherein the first relation is that the level of the sense signal is higher than the level of the reference signal, and the second relation is that the level of the sense signal is lower than the level of the reference signal.

3. The method according to claim 1, wherein the first logic level is a low level and the second logic level is a high level.

4. The method according to claim 1, wherein a ratio of a duration of the occurrence of the comparison signal at the second logic level to a duration of the occurrence of the comparison signal at the first logic level is calculated within the preset time period to determine whether a touch action is conducted on the capacitive touch-sensing panel.

5. The method according to claim 4, wherein the comparison signal is periodically sampled, and respective counts of the occurrence of the first logic level and the occurrence of the second logic level are calculated within the preset time period to determine the durations of the comparison signal at the first logic level and the second logic level, respectively.

6. The method according to claim 1, wherein the comparison signal is periodically sampled, and a count of the occurrence of the second logic level is calculated within the preset time period to determine whether a touch action is conducted on the capacitive touch-sensing panel.

7. The method according to claim 6, wherein a touch action is determined to be conducted on the capacitive touch-sensing panel when the count of the occurrence of the second logic level within the preset time period is greater than a threshold number.

8. The method according to claim 1, wherein the reference signal is set or adjusted to have the level of the sense signal become in the first relation to the level of the reference signal in the initial state by adjusting a capacitance of a capacitor coupled to the reference signal.

9. A sensing circuit for sensing a touch action on a capacitive touch-sensing panel, comprising:
   a comparator having a first input terminal and a second input terminal for continuously receiving a sense signal and a reference signal, respectively, and generating a comparison signal according to a compared result of the sense signal and the reference signal;
   a variable capacitor coupled to the reference signal for adjusting a level of the reference signal; and
   a control circuit coupled to the comparator for determining whether a touch action is conducted on the capacitive touch-sensing panel according to the comparison signal,
   wherein the level of the reference signal is set or adjusted by way of the variable capacitor to have a level of the sense signal, when compared with the reference signal by the comparator, be in a first relation to the level of the reference signal in an initial state of the capacitive touch-sensing panel, and a level of the sense signal is compared with the level of the reference signal to generate the comparison signal in a sensing state, wherein the comparison signal is outputted with a first logic level when a level of the sense signal is in the first relation to the level of the reference signal in the sensing state, and the comparison signal is outputted with a second logic level when a level of the sense signal is in a second relation to the level of the reference signal in the sensing state.

10. The sensing circuit according to claim 9, wherein the first relation is that the level of the sense signal is higher than the level of the reference signal, and the second relation is that the level of the sense signal is lower than the level of the reference signal.

11. The sensing circuit according to claim 9, wherein the first logic level is a low level and the second logic level is a high level.

12. The sensing circuit according to claim 9, wherein a ratio of a duration of the occurrence of the comparison signal at the second logic level to a duration of the occurrence of the comparison signal at the first logic level is calculated by the control circuit within the preset time period to determine whether a touch action is conducted on the capacitive touch-sensing panel.

13. The sensing circuit according to claim 12, wherein the comparison signal is periodically sampled by the control circuit, and respective counts of the occurrence of the first logic level and the occurrence of the second logic level are calculated by the control circuit within the preset time period to determine the durations of the comparison signal at the first logic level and the second logic level, respectively.

14. The sensing circuit according to claim 9, wherein the comparison signal is periodically sampled by the control circuit, and a count of the occurrence of the second logic level is calculated by the control circuit within the preset time period to determine whether a touch action is conducted on the capacitive touch-sensing panel.

15. The sensing circuit according to claim 14, wherein a touch action is determined to be conducted on the capacitive touch-sensing panel by the control circuit when the count of the occurrence of the second logic level within the preset time period is greater than a threshold value.

16. A touch control device, comprising:
   a capacitive touch-sensing panel where a touch action is conducted; and
   a sensing circuit for sensing a touch action on the capacitive touch-sensing panel, comprising:
      a comparator having a first input terminal and a second input terminal for continuously receiving a sense signal and a reference signal, respectively, and generating a comparison signal according to a compared result of the sense signal and the reference signal;
      a variable capacitor coupled to the reference signal for adjusting a level of the reference signal; and
      a control circuit coupled to the comparator for determining whether a touch action is conducted on the capacitive touch-sensing panel according to the comparison signal,
      wherein the level of the reference signal is set or adjusted by way of the variable capacitor to have a level of the sense signal, when compared with the reference signal by the comparator, be in a first relation to the level of the reference signal in an initial state of the capacitive touch-sensing panel, and a level of the sense signal is compared with the level of the reference signal to generate the comparison signal in a sensing state, wherein the comparison signal is outputted with a first logic level when a level of the sense signal is in the first relation to the level of the reference signal in the sensing state, and the comparison signal is outputted with a second logic level when a level of the sense signal is in a second relation to the level of the reference signal in the sensing state.

17. The touch control device according to claim 16, wherein the first relation is that the level of the sense signal is higher than the level of the reference signal, and the second relation is that the level of the sense signal is lower than the level of the reference signal.

18. The touch control device according to claim 16, wherein the first logic level is a low level and the second logic level is a high level.

19. The touch control device according to claim 16, wherein a ratio of a duration of the occurrence of the comparison signal at the second logic level to a duration of the occurrence of the comparison signal at the first logic level is calculated by the control circuit within the preset time period to determine whether a touch action is conducted on the capacitive touch-sensing panel.

20. The touch control device according to claim 16, wherein the comparison signal is periodically sampled by the control circuit, and a count of the occurrence of the second logic level is calculated by the control circuit within the preset time period to determine whether a touch action is conducted on the capacitive touch-sensing panel.

* * * * *